United States Patent Office 3,714,060
Patented Jan. 30, 1973

3,714,060
NUCLEAR REACTOR FUEL AND FUEL ELEMENT
AND PREPARATION THEREOF
Marvin Tetenbaum, Hinsdale, and Paul D. Hunt, Lemont,
Ill., assignors to the United States of America as represented by the United States Atomic Energy Commission
No Drawing. Filed Feb. 12, 1971, Ser. No. 115,121
Int. Cl. C01g 43/00
U.S. Cl. 252—301.1 R                                       5 Claims

ABSTRACT OF THE DISCLOSURE

A nuclear reactor fuel and fuel element therefrom comprising uranium oxycarbide containing 500–2500 parts per million of oxygen having the empirical formula $$UC_{1.00}O_{.01-.05}$$

prepared by heating single phase UC at a temperature in the range of about 2000° K.–2400° K., passing helium carrier gas containing CO and $CO_2$ over said heated UC at a sufficiently high ratio of CO to $CO_2$ to prevent formation of $UO_2$, such as at 10,000:1, and for a time to produce said product.

BACKGROUND OF THE INVENTION

The invention relates to a nuclear reactor fuel comprising uranium carbide containing oxygen combined therewith, also to the preparation of such fuel, and to fuel elements, particularly steel clad fuel elements made with such oxygen containing uranium carbide fuel.

Uranium carbide is well known as a fuel for nuclear reactors, especially of the breeder types. Such fuels are generally in the form of blocks or cylinders clad with steel, usually a stainless steel. However, uranium carbide fuels which have hitherto been made have either contained high contents of oxygen, such as .5% or higher, in the form of $UO_2$, or have been substantially pure single phase UC containing less than 380 parts per million of oxygen, as described in U.S. Pat. 3,392,005.

One big disadvantage of uranium carbide fuel is the transfer of carbon to the cladding, particularly to the steel cladding of clad fuel elements containing uranium carbide. Any uranium carbide fuel which would have increased stability and decreased tendency of carbon transfer over those uranium carbide fuels above mentioned and hitherto known to the art would be very desirable.

SUMMARY OF THE INVENTION

Applicants discovered that there was a critical content of oxygen combined with uranium carbide which gave decreased carbon activity and hence a decreased tendency of the carbon of the uranium carbide to react with the cladding material, particularly steel cladding of the clad fuel element. Such an oxygen content was found to be 500–2500 parts per million of oxygen, corresponding to a uranium oxycarbide having the empirical formula $$UC_{1.00}O_{.01-.05}$$

This fuel contains no U and no $UO_2$.

The uranium oxycarbide fuel of this invention is prepared by contacting single phase UC (no U and no $UO_2$) with a mixture of CO and $CO_2$, preferably in an inert carrier gas such as helium or argon at a ratio of CO to $CO_2$ sufficiently high to prevent formation of $UO_2$, such as a range of 10,000–100,000 to 1, at a temperature in the approximate range of 2000° K.–2400° K. for a time sufficient to complete the formation of $UC_{1.00}O_{.01-.05}$ such as for 3–10 hours or longer, the reaction being carried out with a carrier gas having subatomspheric partial pressure of CO of, for example, 4–10 torr (balance He). Temperatures below 2000° K. may be used but this increases the time, and while temperatures above 2400° K. can be used the results are nonuniform and such high temperatures are not desirable for best results. It is preferred that helium carrier gas containing the CO and $CO_2$ be continuously passed over the heated UC until the reaction is completed.

The key to obtaining the low oxygen addition to the UC is the use of a mixture of CO and $CO_2$ having a very high ratio of CO to $CO_2$ such as 30,000 to 1. Applicants have been able to readily adjust the $CO_2$ feed by a sample analysis technique whereby $CO_2$ is cold trapped (frozen out of the gas mixture) at −78° C. on silica gel with subsequent quantitative analysis by gas chromatography.

The uranium oxycarbide fuel produced by applicants' method not only has the important critical limitation of oxygen of 500–2500 parts per million, which gives decreased transfer of carbon to cladding, but also has the advantage of being free from U and $UO_2$, both of which are undesirable in UC fuel elements.

The carbon activity of $UC_{1.00}O_{.01-.05}$ produced by our process is approximately 0.001 as compared to 0.15 for single phase $UC_{1.00}$. This carbon activity is regarded by applicants as a measure of the tendency of the carbon of the UC to transfer to cladding material such as steel. The carbon activity of the uranium carbide produced by the process of U.S. Pat. 3,392,005 is close to that of $UC_{1.00}$ and several orders of magnitude greater than uranium oxycarbide of this invention. With uranium oxycarbide containing $UO_2$ the carbon activity is substanitally greater than for applicants' uranium oxycarbide, and applicants' absence of $UO_2$ is an advantage for nuclear reaction fuel which should contain as high UC as possible commensurate with low carbon activity.

DESCRIPTION OF SPECIFIC EMBODIMENTS

In our experimental work in carrying out the process of this invention considerable effort was made to purify the carrier gases CO, argon and helium to minimize contamination from $CO_2$, $H_2O$ and oxygen. To avoid the formation of $UO_2$ when investigating the UCO region, the oxygen partial pressure must be lower than that needed for the formation of $UO_2$. Therefore very high $CO/CO_2$ ratios are required. With a gettering system consisting of a combination of hot copper and a molecular sieve, we were able to obtain a CO-He carrier gas mixture containing less than 0.1 part per million $CO_2$.

Oxygen partial pressure, carbon activity, and total pressure of uranium-bearing species were measured at 2255 and 2355° K. with a carrier gas having a CO partial pressure of ∼10 torr (balance helium). The uranium charge used in our studies consisted of a spherical −8+12 mesh powder with the following composition: ∼4.55 wt. percent carbon (C/U=0.96), ∼150 p.p.m. oxygen, ∼350 p.p.m. nitrogen, and <200 p.p.m. metallic impurities. The results are summarized in Table I. Recent experiments at high carrier-gas flowrates minimized the discrepancy between input and output $CO/CO_2$ ratios. Metallographic examination of the residues did not show the presence of $UO_2(s)$ in the matrix or on the surface of the particles in any of the experiments.

TABLE I.—VALUES OF CARBON ACTIVITY AND OXYGEN PARTIAL PRESSURE FOR U-C-O SYSTEM

| Run | 95-1 | 95-2 | 100-1 |
|---|---|---|---|
| Temperature, °K | 2,255 | 2,255 | 2,355 |
| Time of run, hour | 5.3 | 12 | 5.5 |
| Carrier gas | CO-He | CO-He | CO-He |
| Flow rate, ml./min | 180 | 180 | 1,100 |
| Partial pressure CO in carrier gas, torr | ~10 | ~10 | ~10 |
| $CO/CO_2$, input gas | $1.3 \times 10^5$ | $1.3 \times 10^5$ | $3.2 \times 10^4$ |
| $CO/CO_2$, output gas | $1.2 \times 10^4$ | $1.3 \times 10^4$ | $2.2 \times 10^4$ |
| $-\log p(O_2)$ (based on input) | 14.25 | 14.24 | 12.52 |
| $-\log p(O_2)$ (based on output) | 12.18 | 12.28 | 12.20 |
| Carbon activity (based on input) | 0.011 | 0.011 | $2.0 \times 10^{-3}$ |
| Carbon activity (based on output) | 0.0011 | 0.0012 | $1.4 \times 10^{-3}$ |
| Composition | $UC_{0.99}O_{0.03}$ | $UC_{1.03}O_{0.03}$ | $UC_{1.00}O_{0.04}$ |
| Nitrogen content, p.p.m | 99 | | 710 |
| Metallographic examination | (¹) | (¹) | (¹) |

¹ $UO_2$ not detected.

From the data in the above Table I we calculated carbon activities to be between $10^{-2}$ and $10^{-3}$ at 2255° K., and approximately $2 \times 10^{-3}$ at 2355° K. For comparison, the carbon-activity values, based on our measurements with $H_2$—$CH_4$ mixtures over "oxygen-free" $UC_x$ compositions ranging from C/U=0.99 to C/U=1.00, yielded values of $a_C$ ranging from 0.09 to 0.15, respectively, at 2255° K., and ~0.15 at 2355° K. The effect of a small addition of oxygen, e.g., 1.5–2.0 at. percent, results in a significant reduction in the activity of carbon.

In an additional series of experiments oxygen partial pressure, carbon activity, and total pressure of uranium-bearing species were measured at 2355° K. with a carrier gas having a CO partial pressure of ~4 torr (balance helium) and a $CO/CO_2$ ratio of $\sim 5 \times 10^4$. The composition of the uranium carbide charge was C/U=0.96. The results are summarized in Table II.

The lower oxygen content (about 1 atomic percent) of the oxycarbide residue, when compared with previous results (about 2 atomic percent; Run 100–1 given in table for comparison and also shown in Table I), appears to be consistent with the lower oxygen partial pressure (higher $CO/CO_2$ ratio) of the carrier gas used in the later runs. The slightly lower values for the calculated carbon activity reflect the lower CO partial pressures used in the present runs. Consistent with previous results, the effect of a small addition of oxygen is a significant reduction in the activity of carbon.

A rough estimate of the free energy of formation of the oxycarbide composition $UC_{1.00}O_{0.02}$ at 2355° K. was made from values for oxygen partial pressure, carbon activity, and total pressure of uranium-bearing species derived from our measurements. In the absence of species information, the uranium activity was roughly estimated based on the total pressure of uranium-bearing species, the assumption that the vapor is uranium gas, and the sublimation pressure of pure uranium. From the expression $\Delta G_f^\circ = R'T \log (N_i \Sigma a_i)$, a tentative value of $\Delta G_f^\circ \simeq -41.6$ kcal./mol was obtained The embodiments of the invention in which an exclusive property or privilege is claimed are defined as follows:

1. The process of making a nuclear reactor fuel comprising contacting UC with a mixture of CO and $CO_2$ having a ratio of CO to $CO_2$ between about 10,000:1 and 100,000:1 at a temperature in the approximate range of 2000° K.–2400° K. for a time sufficient to complete the formation of a uranium oxycarbide having the empirical formula $UC_{1.00}O_{.01-.05}$.

2. The process of claim 1 wherein the mixture of CO with $CO_2$ contains an inert gas.

3. The process of claim 1 wherein the mixture of gas includes the carrier gases CO and He and the mixture is passed continuously over the UC.

4. The process of claim 3 wherein the CO of the carrier gas has a partial pressure of 4–10 torr, the balance being He.

5. The process of claim 1 wherein the time is 3–10 hours.

TABLE II.—VALUES OF CARBON ACTIVITY, OXYGEN PARTIAL PRESSURE, AND TOTAL PRESSURE OF URANIUM-BEARING SPECIES FOR U-C-O SYSTEM

| Run | 100-1 | 101-1 | 101-2 |
|---|---|---|---|
| Temperature, °K | 2,355 | 2,355 | 2,355 |
| Time of run, hours | 5.5 | 2.9 | 6.7 |
| Flow rate, liters/min | 1.10 | 1.08 | 1.08 |
| Carrier gas | CO-He | $CO-CO_2$-He | $CO-CO_2$-He |
| Partial pressure CO in carrier gas, torr | ~10 | 4 | 4 |
| $CO/CO_2$, input | $3.2 \times 10^4$ | $5.4 \times 10^4$ | $5.7 \times 10^4$ |
| $CO/CO_2$, output | $2.2 \times 10^4$ | $4.6 \times 10^4$ | $4.7 \times 10^4$ |
| $-\log p(O_2)$ (based on input), atm | 12.52 | 12.98 | 12.94 |
| $-\log p(O_2)$ (based on output), atm | 12.20 | 12.70 | 12.78 |
| Carbon activity (based on input) | $2.0 \times 10^{-3}$ | $1.3 \times 10^{-3}$ | $1.4 \times 10^{-3}$ |
| Carbon activity (based on output) | $1.4 \times 10^{-3}$ | $1.0 \times 10^{-3}$ | $1.1 \times 10^{-3}$ |
| $-\log p(U)$ total pressure of uranium-bearing species, atm | 5.61 | | 5.83 |
| Composition | $UC_{1.00}O_{0.04}$ | $UC_{1.00}O_{0.02}$ | $UC_{1.00}O_{0.02}$ |
| Metallographic examination | (¹) | (¹) | (¹) |

¹ $UO_2$ not detected.

References Cited

UNITED STATES PATENTS 3,386,811  6/1968  Hanson _____ 23—349 X
3,398,098  8/1968  Hanson _____ 252—301.1
3,219,541  9/1965  Bradley _____ 176—67

FOREIGN PATENTS 1,052,084  12/1966  Great Britain _____ 23—349

OTHER REFERENCES

Russell et al., Carbides in Nuclear Energy, vol. 2, 1964, Macmillian & Co., Ltd., London, pp. 674, 675, 738–40.

CARL D. QUARFORTH, Primary Examiner

R. L. TATE, Assistant Examiner

U.S. Cl. X.R.

176—67; 423—253, 256